(12) United States Patent
Wyble et al.

(10) Patent No.: US 10,959,059 B1
(45) Date of Patent: Mar. 23, 2021

(54) PROVIDING INTELLIGENT CONTENT RECOMMENDATIONS TO GROUPS OF PEOPLE

(71) Applicant: INTERNATIONAL BUSINESS MACHINES CORPORATION, Armonk, NY (US)

(72) Inventors: Christopher D. Wyble, Poughkeepsie, NY (US); Peter J. Mostachetti, Ulster, NY (US); Michael J. Young, Dutchess, NY (US); Brian C. Main, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/654,376

(22) Filed: Oct. 16, 2019

(51) Int. Cl.
| | |
|---|---|
| *H04W 4/06* | (2009.01) |
| *H04W 4/23* | (2018.01) |
| *H04L 29/08* | (2006.01) |
| *H04W 4/21* | (2018.01) |
| *G06F 16/9536* | (2019.01) |

(52) U.S. Cl.
CPC ............. *H04W 4/06* (2013.01); *H04L 67/306* (2013.01); *H04W 4/23* (2018.02); *G06F 16/9536* (2019.01); *H04L 67/20* (2013.01); *H04W 4/21* (2018.02)

(58) Field of Classification Search
CPC ......... H04W 4/00–08; H04W 4/18–20; H04W 4/23; H04W 4/30; H04W 4/35; H04W 4/38; H04W 4/21; H04W 8/08–205; G06F 16/9536; H04L 67/20; H04L 67/306
See application file for complete search history.

(56) References Cited

U.S. PATENT DOCUMENTS

| | | | |
|---|---|---|---|
| 7,756,753 B1 | 7/2010 | McFarland | |
| 2012/0036523 A1* | 2/2012 | Weintraub | H04N 21/252 725/9 |
| 2012/0078829 A1* | 3/2012 | Bodor | G06F 16/435 706/45 |
| 2012/0180107 A1* | 7/2012 | Gammill | G06Q 30/02 726/3 |
| 2013/0218905 A1 | 8/2013 | Sankarasubramaniam et al. | |
| 2015/0052132 A1* | 2/2015 | Ching | H04L 67/306 707/736 |

(Continued)

OTHER PUBLICATIONS

Mell, et al., "The NIST Definition of Cloud Computing, "Recommendations of the National Institute of Standards and Technology, Sep. 2011, 7p.

*Primary Examiner* — San Htun
(74) *Attorney, Agent, or Firm* — Cantor Colburn LLP; Teddi Maranzano (57) ABSTRACT

Aspects of the invention include providing intelligent content recommendations to groups of people. A non-limiting example computer-implemented method includes identifying, by a processor, the presence of a plurality of users in a location. The method creates a virtual user with a virtual user profile, by the processor, from profiles of the plurality of users and provides, by the processor, a recommendation to the plurality of users of content to consume based on the virtual user's profile. The method serves, by the processor, the recommended content.

17 Claims, 7 Drawing Sheets

(56) References Cited

U.S. PATENT DOCUMENTS

2015/0066648 A1* 3/2015 Kane, Jr. .................. G06N 5/02
705/14.58
2016/0255170 A1* 9/2016 Gargi .................. G06F 16/9535
709/204

* cited by examiner

PROVIDING INTELLIGENT CONTENT RECOMMENDATIONS TO GROUPS OF PEOPLE

BACKGROUND

The present invention generally relates to content recommendations and more specifically, to providing intelligent content recommendations to groups of people.

Various types of services have content repositories for individual users. Content repositories have long provided recommendations on what content a user may want to consume in the future, based on the content the user has consumed in the past. However, all of these recommendations are based on the consumption patterns of a single user as opposed to groups of users.

SUMMARY

Embodiments of the present invention are directed to providing intelligent content recommendations to groups of people. A non-limiting example computer-implemented method includes identifying, by a processor, the presence of a plurality of users in a location. The method creates a virtual user with a virtual user profile, by the processor, from profiles of the plurality of users and provides, by the processor, a recommendation to the plurality of users of content to consume based on the virtual user's profile. The method serves, by the processor, the recommended content.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide for extending existing capabilities used by content repositories, such as video and music streaming services, by creating virtual users that represent groups of individual users. Through this method, previously unavailable recommendations could be offered.

Various types of services store consumption data for individual users. Embodiment of the present invention create a virtual user that represents a group of individual users who desire to consume content from the repository together. That is, virtual user ABC exists as the union of individual users A, B, and C, and the system is aware of the previously viewed content for each individual user.

Existing systems do not account for simultaneous content consumption by multiple users. There is no aggregation of their tastes and prior content consumption. Therefore, the system has no way of knowing what content should be recommended to a plurality of people engaging in consumption together.

One or more embodiments of the present invention address one or more of the above-described shortcomings of the prior art by providing a virtual user who is an amalgamation of the past consumption habits of each individual user.

Previously consumed content that exists at the logical intersection of the individual users' interests is one way by which recommendations are made to the virtual user. This is an extension of the existing recommendation engine; any content in the repository that would have been recommended to an individual user with the virtual user's consumption history would be recommended to the virtual user.

Extending the system beyond this simple intersection, to content that exists on the fringes of the logical intersection but otherwise has some criteria that increase the likelihood that all of the individual users comprising the virtual user will enjoy the content recommended is also provided. For example: A party with 25 attendees. Each attendee receives a code that identifies the party, and enters it into the streaming service. The streaming service then uses their favorites/playlists to create a new recommended playlist based on all entered codes.

To achieve this threshold of presumed enjoyment, the system conducts metadata analysis (for example, if recommending a movie, the metadata would include the year, genre, names of cast members and crew, and other topical keywords or tags) and assigns a confidence level to the recommendation. When the confidence level exceeds a threshold that is set by the virtual user, the recommendation is presented to the virtual user. When it fails to meet the threshold, it is discarded as a recommendation.

The system stores the virtual users' consumption data (as if it were any other individual user) to reduce the computing workload for future sessions when the group consumes content together. The system responds differently to a new consumption session of a virtual user than an individual user by querying the consumption history for updates to the component individual users and updating its recommendations accordingly.

Disadvantages of contemporary approaches may include the inability to account for consumption data for more than a single individual and provide recommendations to groups of individuals. One or more embodiments of the present invention provide technical solutions to one or more of these disadvantages of existing solutions by providing for the creation of a virtual user that is an amalgam of the tastes of the individual users used to create the virtual user. This virtual user then has its own consumption data that is used to make recommendations and is updated for future use.

Figure 1:
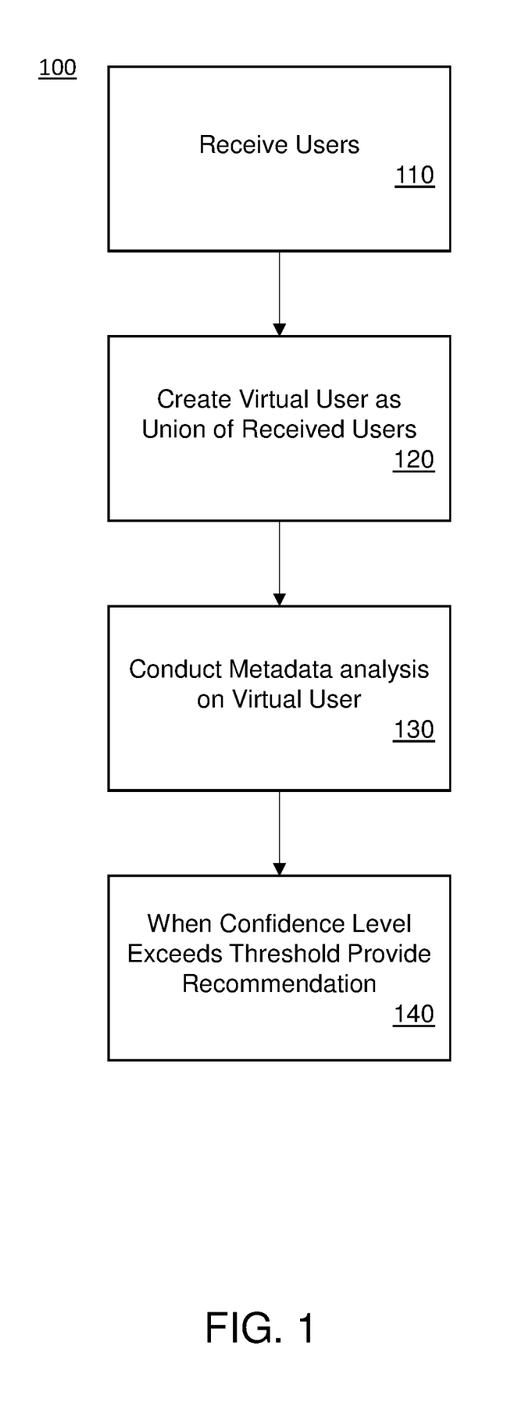
FIG. 1 illustrates a flowchart of a virtual user recommendation engine is generally shown in accordance with one or more embodiments of the present invention.

Turning now to FIG. 1, a flowchart 100 of a virtual user recommendation engine is generally shown in accordance with one or more embodiments of the present invention. The virtual user recommendation engine ("VURE") 100 receives notice that a plurality of users are accessing content together (block 110). This may be accomplished through user's entering identification or login information into the service or by other means, such as facial recognition.

A virtual user is then created as the amalgamation of the consumption data of each individual registered user (block 120). A simple embodiment of virtual user creation is provided for the case where user profiles contain a selection of elements with corresponding weights. For example, in the scenario of a media sharing service, specific songs or traits of songs are assigned to a user with weights that determine the recommendations provided to that user: "Bob likes rock music (at weight 60) and female vocals (at weight 90) similar to Gwen Stefani (weight 30)." In this embodiment, each user's elements and weights could be represented as a 2-column matrix and the virtual user could be created with arithmetic addition of the input user matrices.

Embodiments of the present invention may also combine user information into virtual users with far more complicated arrangements. For example, in a scenario where a parent or teacher is able to influence the recommendation parameters, the virtual user is created by amplifying the weights of these "special" input users. Keeping with the simple matrix example, this is achieved by a matrix multiplication of the parent/teacher user profiles prior to the addition step to create a virtual user.

Other embodiments include emphasizing areas where all of the users share similar profile traits, and/or highlighting fringe areas that only exist because of the combination of users: For example, User 1 likes horror, User 2 likes films with strong female leads, and User 3 likes documentary-style films. A film with all three of these traits might not score highly for any individual user's recommendations, but as a virtual user it could be highlighted as a special match.

Based on these combined traits, metadata analysis is performed on the virtual user, just as it is in the existing methodologies (block 130). When a confidence level of a recommendation exceeds a threshold value, the recommendation is provided to the virtual user, who is in fact the group of individual users (block 140).

Figure 2:
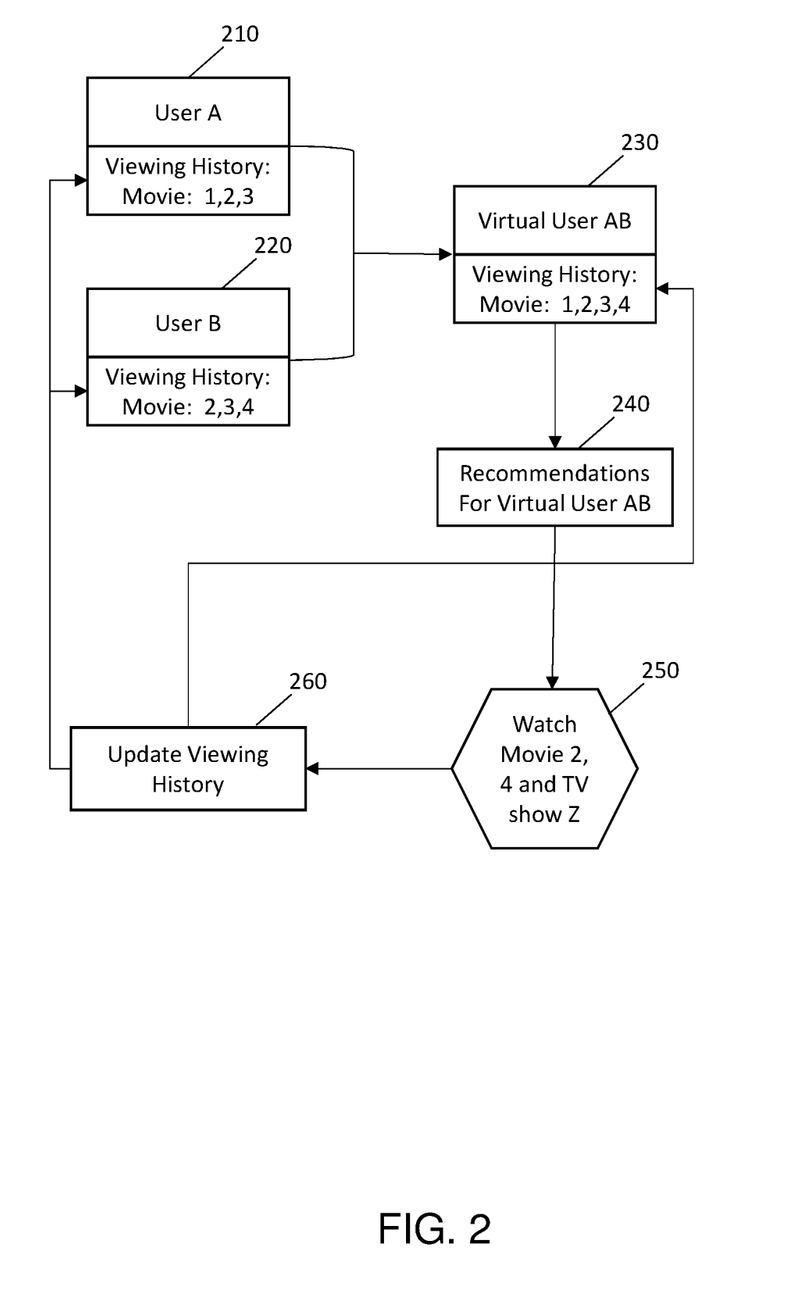
FIG. 2 illustrates an example of creation of a virtual user and provision of recommendations to the virtual user in accordance with one or more embodiments of the present invention.

FIG. 2 illustrates an example of creation of a virtual user and provision of recommendations to the virtual user in accordance with one or more embodiments of the present invention. A User A 110 has a viewing history of movies 1, 2, and 3. A User B has a viewing history of movies 2, 3, and 4. A Virtual User AB 230 is created as previously described and has a viewing history of the union of User A's and User B's viewing history. Additionally, if a movie is 10% seen by User A but is 75% seen by User B, then Virtual User AB's history should state that it has seen 75% of the movie. Recommendations are made for Virtual User AB 230 (block 240). Elements in the set should be weighted by factors such as: how many users have seen it; how much each user liked/rated it; how closely it matched recommendations for any given individual user and/or subsets of users A and B. In this example, the group of users that form the Virtual User AB 250 opts to watch movies 2 and 4 and TV show 2 (block 250). The viewing histories of User A, User B, and the Virtual User AB are all updated with this information (block 260).

Figure 3:
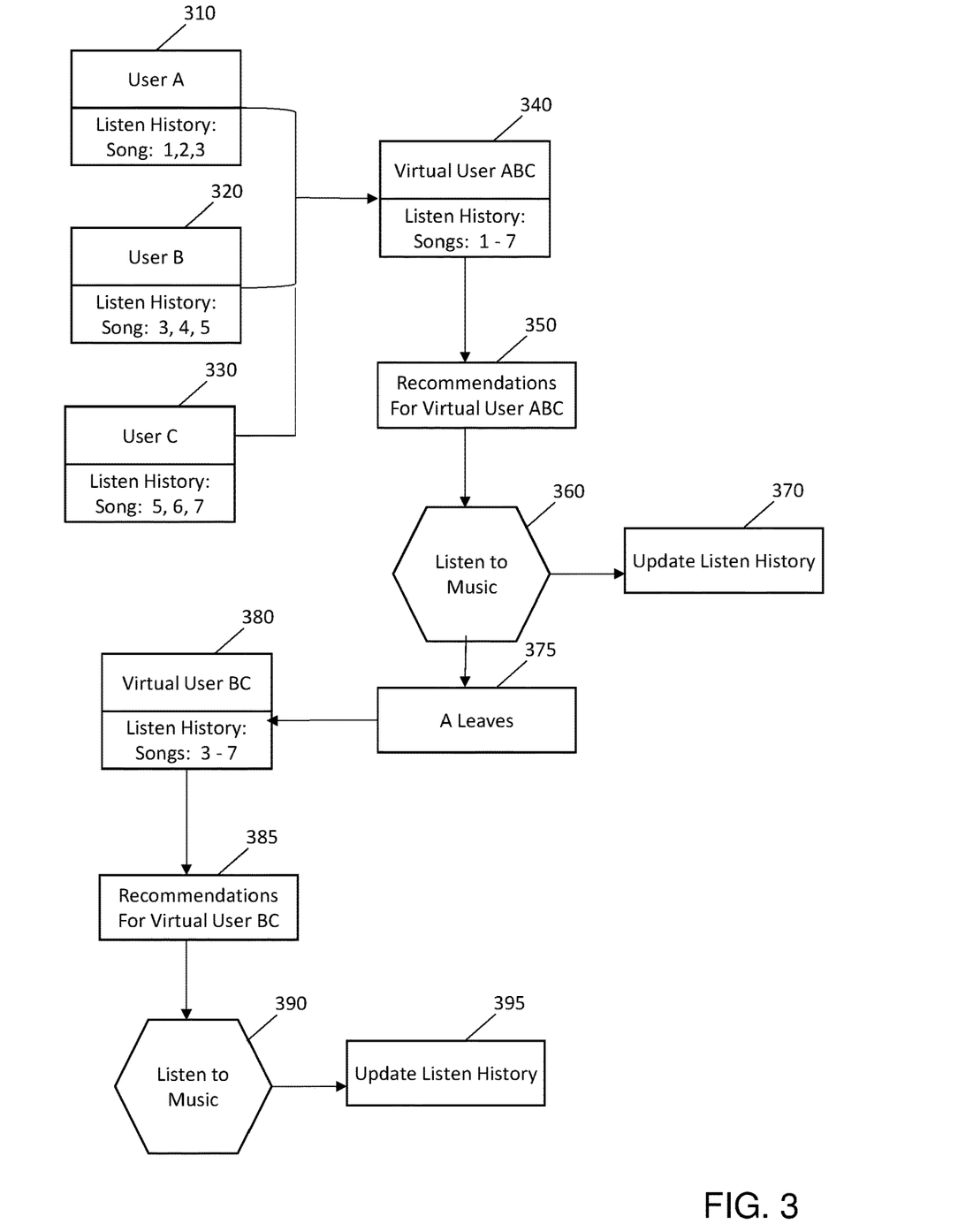
FIG. 3 illustrates another example of creation of a virtual user and provision of recommendations to the virtual user in accordance with one or more embodiments of the present invention.

FIG. 3 illustrates another example of creation of a virtual user and provision of recommendations to the virtual user in accordance with one or more embodiments of the present invention. Suppose Users A 310, B 320, and C 330 own profiles on a music streaming service. User A 310 has listened to Songs 1, 2, and 3. User B 320 has listened to Songs 3, 4, and 5. User C 330 has listened to Songs 5, 6, and 7. The streaming service recognizes that all users are currently listening together, so a Virtual User ABC 340 is created. Its history contains the union set of Users A, B, and C, which means Virtual User ABC has listened to Songs 1 through 7. It also chooses elements in the set based on weighted factors such as: how many users have seen it; how much each user liked/rated it; how closely it matched recommendations for any given individual user and/or subsets of Virtual User ABC 340 (block 350). Any recommendations that would normally be shown to User A 310, B 320, or C 330 when they are using the service individually will now be calculated using the Virtual User ABC's 340 preferences and weighting algorithms.

After Users A 310, B 320, and C 330 listen to music (block 360), the listen history for each individual user and the virtual user are updated (block 370). If User A leaves (block 375), a new Virtual User BC 380 is created as previously described. Recommendations are given for Virtual User BC 380 (block 385), and the group listens to music (block 390). After that, the history for User B 320, User C 330, and the Virtual User BC 380 are updated (block 395).

Figure 4:
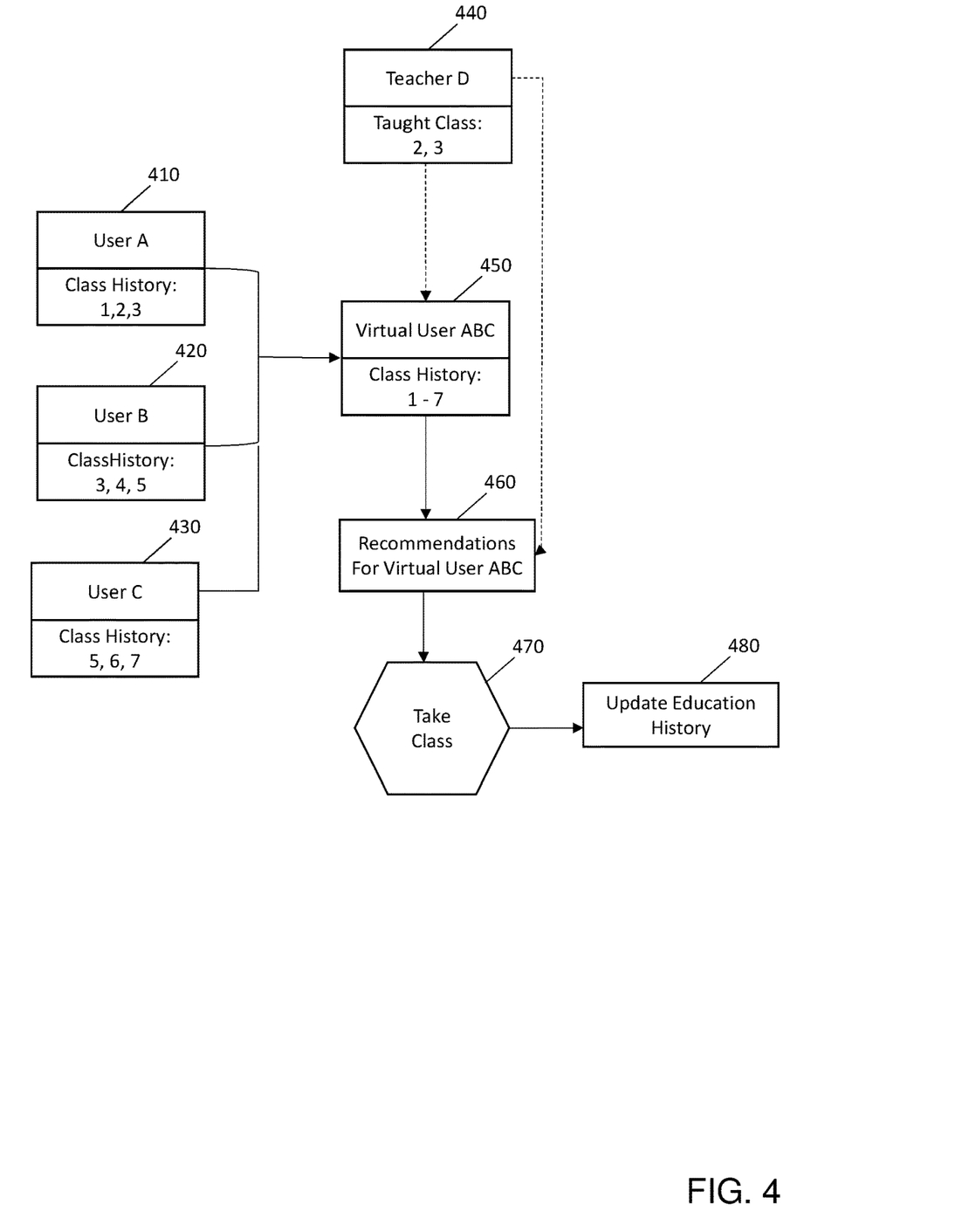
FIG. 4 illustrates another example of creation of a virtual user and provision of recommendations to the virtual user in accordance with one or more embodiments of the present invention.

FIG. 4 illustrates another example of creation of a virtual user and provision of recommendations to the virtual user in accordance with one or more embodiments of the present invention. Suppose Users A 410, B 420, and C 430 own profiles through an education tool. User A 410 has taken Courses 1, 2, and 3. User B 420 has taken Courses 3, 4, and 5. User C has taken Courses 5, 6, and 7. Additionally, there is a Teacher D 440 who has taught Course 2 and 3 before. The education tool recognizes that all Users and the Teacher are together, so a Virtual User ABC 450 is created. Virtual User ABC's 450 history contains the union set of User A 410, B 420, and C 430. Therefore, Virtual User ABC 450 has taken Courses 1 through 7.

Any recommendations that would normally be shown to Users A, B, or C when they are using the service individually will now be calculated using the Virtual User 450 ABC's preferences. The system also includes Teacher D's 440 profile to enhance the recommendations for Virtual User ABC 450 (block 460). Since Teacher D has taught Course 2 and 3 before, it scales the recommendation to other courses similar to those that still would be beneficial to Virtual User ABC 450.

Following class (block 470), the history of Virtual User ABC 460 will be included in Users A, B, and C's history (block 480).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
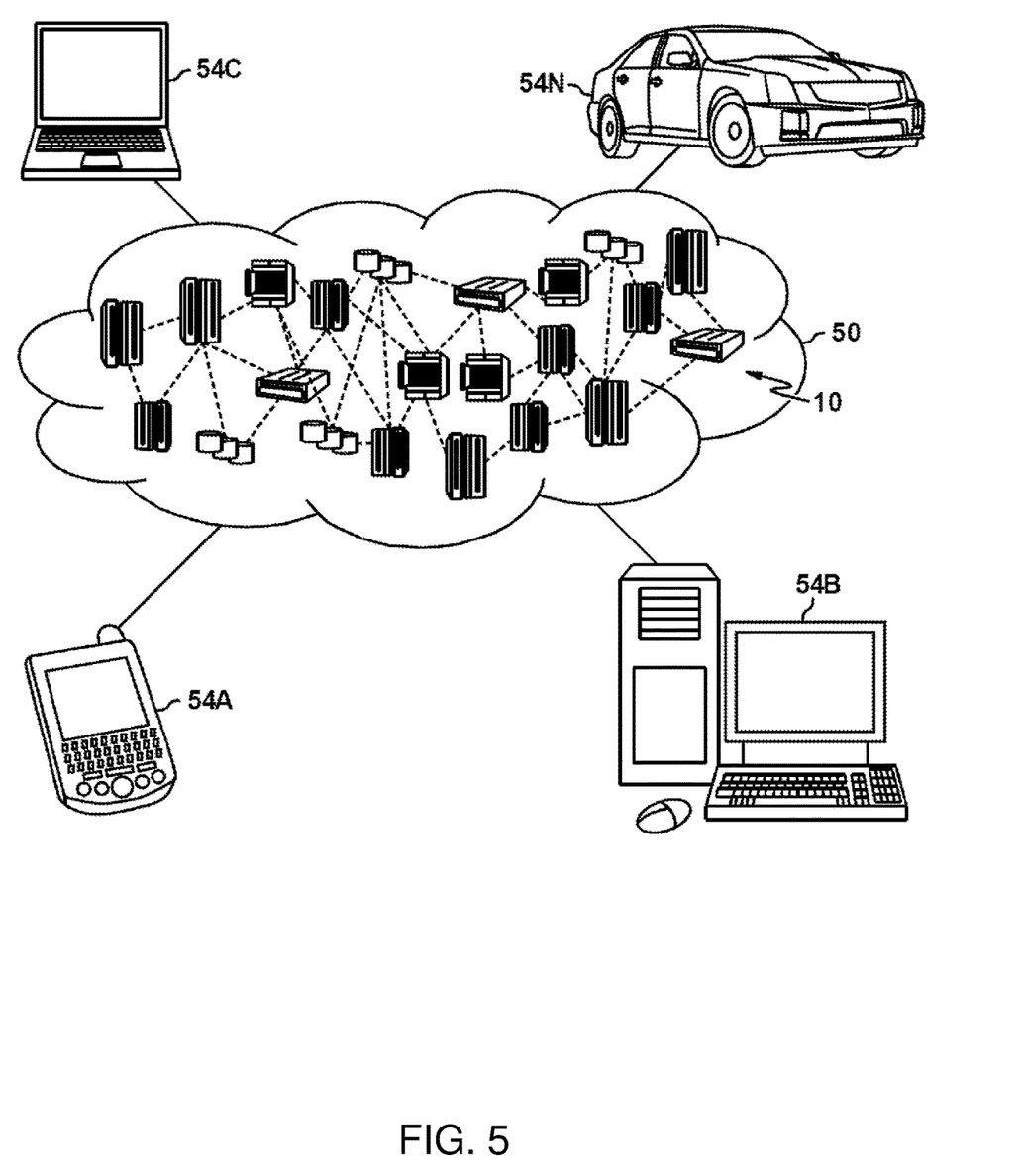
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
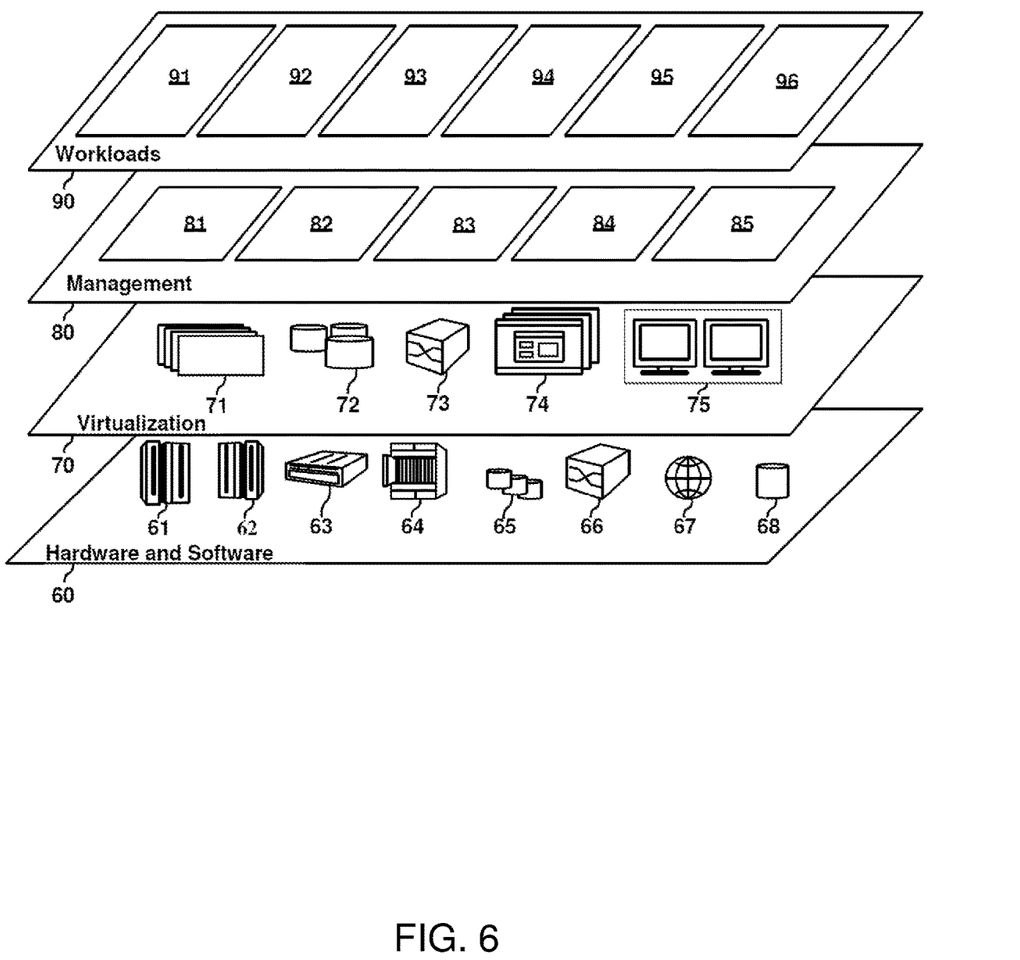
FIG. 6 depicts abstraction model layers according to one or more embodiments of the present invention.

Referring now to FIG. 6, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Secure service container-based virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommendation engine processing 96

Figure 7:
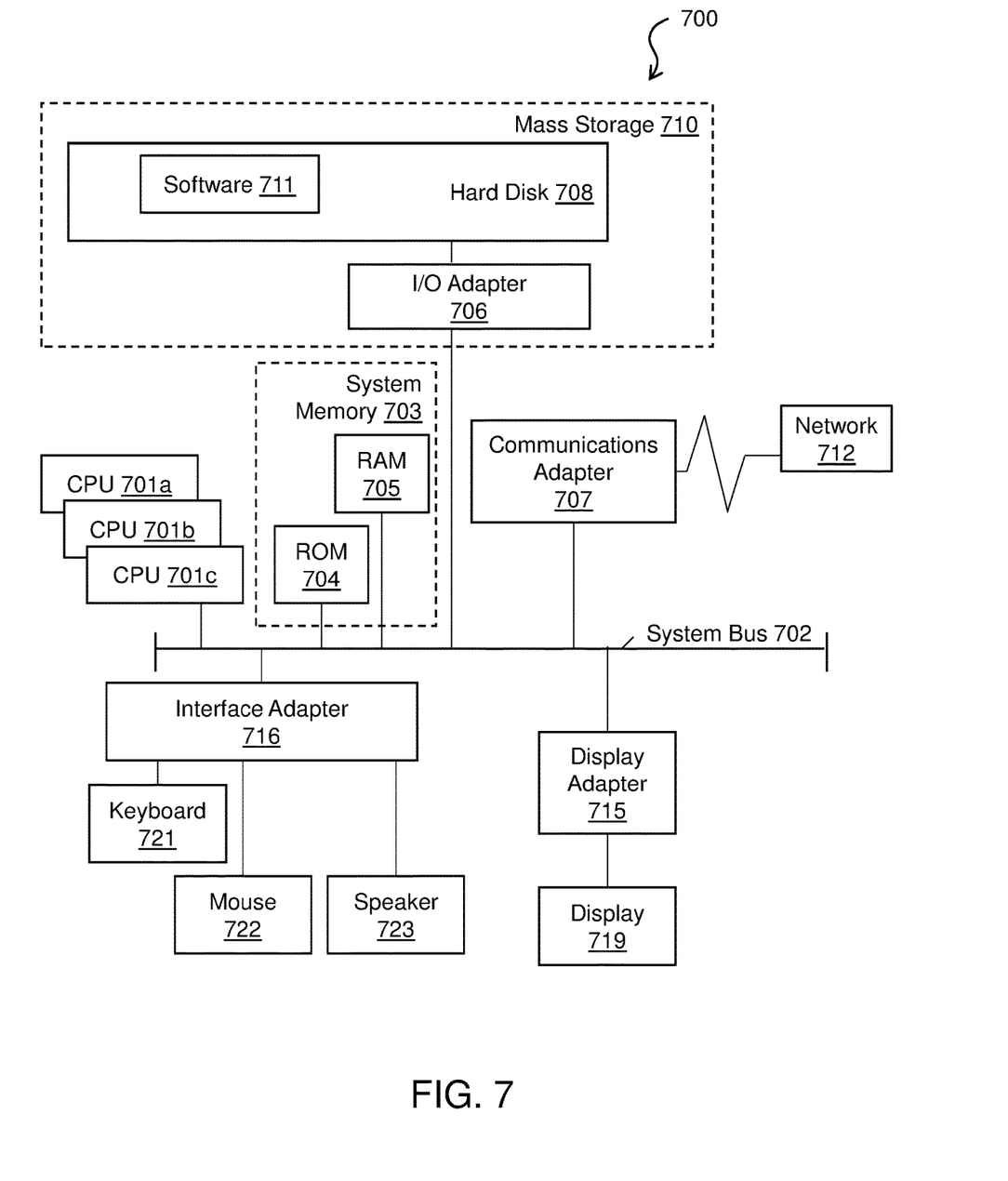
FIG. 7 depicts a computer system in accordance with one or more embodiments of the present invention.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 707, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
identifying, by a processor, the presence of a plurality of users in a location, the plurality of users comprising a first user and a second user, wherein the identifying the presence of the plurality of users in the location comprises at least one of:
receiving a code associated with each user in the plurality of users, the code indicating an identify of each user; and
receiving facial recognition data associated with each user in the plurality of users;
creating a virtual user with a virtual user profile, by the processor, from profiles of the plurality of users, wherein the virtual user profile is created based on a weighted union of the profiles of each user in the plurality of users, wherein the profiles of each user in the plurality of users comprises content that the plurality of users have consumed;
determining that the second user is a special user based on the profiles of each user in the plurality of users, wherein the profile for the second user comprises a higher weight than the profile for first user based on the determination that second user is a special user;
providing, by the processor, a recommendation to the plurality of users of content to consume based on the virtual user's profile; and
serving, by the processor, the recommended content.

2. The method of claim 1, comprising updating the profiles of the plurality of users with a notation of the content consumed.

3. The method of claim 1, comprising updating the profile of the virtual user with a notation of the content consumed.

4. The method of claim 1 wherein the recommendation is provided through analysis of metadata within the virtual user's profile.

5. The method of claim 1, wherein the recommendation is provided when a confidence level of the recommendation exceeds a threshold amount.

6. The computer-implemented method of claim 1, wherein the content comprises a class history.

7. The computer-implemented method of claim 6, wherein the special user comprises a teacher of at least one class in the class history.

8. The computer-implemented method of claim 1, wherein the content comprises at least one of music and movies.

9. A system comprising:
a memory having computer readable instructions; and
one or more processors for executing the computer readable instructions, the computer readable instructions controlling the one or more processors to perform operations comprising:
identifying the presence of a plurality of users in a location, the plurality of users comprising a first user and a second user, wherein the identifying the presence of the plurality of users in the location comprises at least one of:
receiving a code associated with each user in the plurality of users, the code indicating an identify of each user; and
receiving facial recognition data associated with each user in the plurality of users;
creating a virtual user with a virtual user profile from profiles of the plurality of users, wherein the virtual user profile is created based on a weighted union of the profiles of each user in the plurality of users, wherein the profiles of each user in the plurality of users comprises content that the plurality of users have consumed;
determining that the second user is a special user based on the profiles of each user in the plurality of users, wherein the profile for the second user comprises a higher weight than the profile for first user based on the determination that second user is a special user;
providing a recommendation to the plurality of users of content to consume based on the virtual user's profile; and
serving the recommended content.

10. The system of claim 9, comprising updating the profiles of the plurality of users with a notation of the content consumed.

11. The system of claim 9, comprising updating the profile of the virtual user with a notation of the content consumed.

12. The system of claim 9 wherein the recommendation is provided through analysis of metadata within the virtual user's profile.

13. The system of claim 9 wherein the recommendation is provided when a confidence level of the recommendation exceeds a threshold amount.

14. A computer program product comprising a computer readable storage medium having program instructions embodied therewith, the program instructions executable by a processor to cause the processor to perform operations comprising:
identifying the presence of a plurality of users in a location, the plurality of users comprising a first user and a second user, wherein the identifying the presence of the plurality of users in the location comprises at least one of:
receiving a code associated with each user in the plurality of users, the code indicating an identify of each user; and
receiving facial recognition data associated with each user in the plurality of users;
creating a virtual user with a virtual user profile from profiles of the plurality of users, wherein the virtual user profile is created based on a weighted union of the profiles of each user in the plurality of users, wherein the profiles of each user in the plurality of users comprises content that the plurality of users have consumed;
determining that the second user is a special user based on the profiles of each user in the plurality of users, wherein the profile for the second user comprises a higher weight than the profile for first user based on the determination that second user is a special user;
providing a recommendation to the plurality of users of content to serve based on the virtual user's profile; and
serving the recommended content.

15. The computer program product of claim 14, comprising updating the profiles of the plurality of users with a notation of the content consumed.

16. The computer program product of claim 14, comprising updating the profile of the virtual user with a notation of the content consumed.

17. The computer program product of claim 14, wherein the recommendation is provided through analysis of metadata within the virtual user's profile.

* * * * *